H. C. LA GANKE.
PULLEY.
APPLICATION FILED SEPT. 10, 1919.

1,349,618. Patented Aug. 17, 1920.

INVENTOR,
H. C. LaGanke.
BY John A. Bommhardt
ATTY.

UNITED STATES PATENT OFFICE.

HUGO C. LA GANKE, OF CLEVELAND, OHIO, ASSIGNOR TO THE OSBORN CREW MANUFACTURING COMPANY, OF CLEVELAND, OHIO, A CORPORATION OF OHIO.

PULLEY.

1,349,618.  Specification of Letters Patent.  Patented Aug. 17, 1920.

Application filed September 10, 1919. Serial No. 322,786.

*To all whom it may concern:*

Be it known that I, HUGO C. LA GANKE, a citizen of the United States, residing at Cleveland, in the county of Cuyahoga and State of Ohio, have invented certain new and useful Improvements in Pulleys, of which the following is a specification.

This invention relates to an improved metal pulley and more particularly to that type of pulley which is manufactured by press work, and one which may be conveniently used in connection with awnings and for guiding chains which are used to operate furnace dampers and the like.

It has for its object the provision of a pulley which is made as a product of punch presses entirely, and is so constructed as to permit of very easy assembly and one which when finished will provide a construction which will withstand very hard usage and which will endure far greater strains than a cast pulley is capable of.

Owing to the peculiar construction the device may be assembled so cheaply and rapidly that the cost of production is reduced to a minimum, there being so much less labor necessary in the manufacture of the same.

Figure 1:
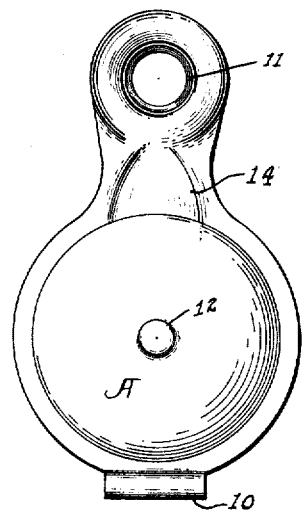
Figure 2:
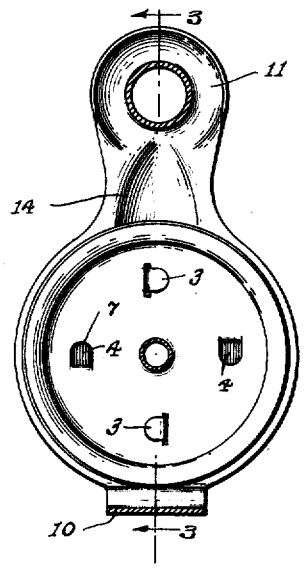
Figure 3:
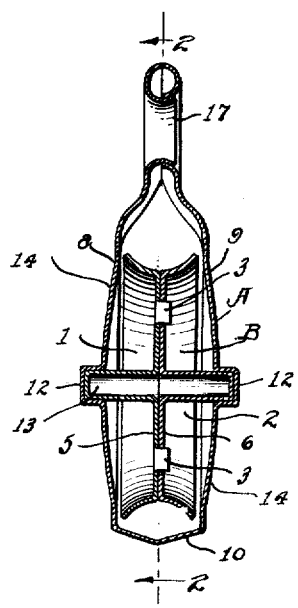
Figure 4:
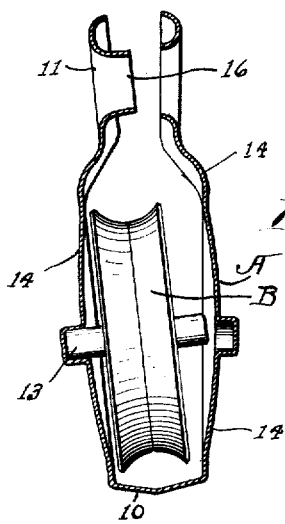

The foregoing objects are obtained in the particular embodiment of the invention shown in the accompanying drawings wherein like reference numerals designate similar parts of reference throughout the various views and wherein Figure 1 is an elevation of a pulley; Fig. 2 is a sectional elevation of a pulley as indicated on the line 2—2 of Fig. 3. Fig. 3 is a section on the line 3—3 of Fig. 2 and Fig. 4 is a sectional detail of the parts shown in the position they assume just before the final assembly thereof.

The pulley as shown comprises two parts, the housing indicated at A and the grooved pulley wheel indicated at B. The wheel itself consists of two cupped stampings 1 and 2 the bases of which are joined to each other by means of diametrically opposed lugs 3 and 4 pressed at right angles to the plane of the bases 5 and 6 and which after entering corresponding apertures 7 in the web of the opposed half of the pulley are bent upon themselves thereby forming effective locking between the two halves of the pulley. A tubular journal 13 is pressed outwardly from the base of each section, as shown. The housing comprises two side members 8 and 9 which are substantially circular in form and are joined at their bottom points by a narrow web 10 which is bent sufficiently to provide clearance between the groove of the pulley and itself so that a rope or chain may conveniently pass therethrough. The side members are provided at their upper points with projections which terminate in eyes 11 and are so formed as to provide, when secured to each other, an eye which will be circular in cross section to prevent the chafing of any fastening device to which the pulley may be secured. The eye is spaced sufficiently from the groove of the pulley to permit the rope or chain to pass therethrough. At the central portion of each of the sides the material is drawn outwardly to provide a cup shaped bearing 12 which is circular in cross section and into which bearings are placed the pintles 13 of the pulley, the pintles or journals of the pulley being at right angles from the center of the web before mentioned. The sides of the housing are slightly concave as at 14 from a point near the outer edges of the center thereof providing thereby a very rigid construction of side member which will not be easily bent or damaged. Owing to the peculiar formation of the eye of the side members the central portion of one eye member is provided with a cylindrical tapered extension 16 which after assembling is crimped over and about the inside of the eye of the other side member as shown at 17, thus the two sides are securely held together at their tops by the peculiar formation of the eye and at their bottom by the aforementioned web. This provides an entirely stamped work pulley consisting of but three parts and requiring no other machine work in the manufacture of the same than that of punch presses. The device after being properly formed may be assembled by machines, thereby eliminating the expensive manual work ordinarily connected with this type of product and consequently eliminating the cost of production.

It is evident that various forms and shapes of housing may be employed and that the same may be provided with various types of hangers, such as a screw, whereby the pulley may be screwed into the rafters and I do not wish to limit myself further in the construction thereof except as defined by the state of the art and that which comes within the scope of the appended claims.

I claim:

1. An integral sheet metal pulley housing comprising opposite sides connected by a web at the lower end and shaped at the upper end to form opposite eye members one of which forms a connecting eyelet between said members.

2. A sheet metal pulley housing the opposite sides of which are slightly concave or dished outwardly and provided with cupped bearing sockets pressed therein at the center of the concavities.

In testimony whereof I do affix my signature in presence of two witnesses.

HUGO C. LA GANKE.

Witnesses:
 JOHN A. BOMMHARDT,
 EUGENE A. CANNING.